United States Patent
Walden

(10) Patent No.: US 10,905,047 B2
(45) Date of Patent: Feb. 2, 2021

(54) GRASS MOWER AND FLOW BOOSTER

(71) Applicant: KUBOTA CORPORATION, Osaka (JP)

(72) Inventor: Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 81 days.

(21) Appl. No.: 15/963,418

(22) Filed: Apr. 26, 2018

(65) Prior Publication Data

US 2019/0327895 A1  Oct. 31, 2019

(51) Int. Cl.
| | |
|---|---|
| A01D 43/077 | (2006.01) |
| A01D 34/66 | (2006.01) |
| A01D 43/063 | (2006.01) |
| A01D 34/71 | (2006.01) |
| A01D 101/00 | (2006.01) |

(52) U.S. Cl.
CPC ......... *A01D 43/077* (2013.01); *A01D 34/667* (2013.01); *A01D 34/71* (2013.01); *A01D 43/063* (2013.01); *A01D 2101/00* (2013.01)

(58) Field of Classification Search
CPC .. A01D 43/077; A01D 43/063; A01D 34/667; A01D 34/71; A01D 34/81; A01D 2101/00
See application file for complete search history.

(56) References Cited

U.S. PATENT DOCUMENTS

| | | | | |
|---|---|---|---|---|
| 1,948,812 | A | * | 2/1934 | Williams ................... F23K 3/04 406/61 |
| 2,903,837 | A | * | 9/1959 | Titzer ................... A01D 43/063 56/12.2 |
| 3,058,284 | A | * | 10/1962 | Anderson .............. A01G 3/002 56/13.3 |
| 3,464,191 | A | * | 9/1969 | Copley .................. A01D 46/08 56/13.3 |
| 3,694,855 | A | * | 10/1972 | Meyer .................... A01D 34/49 16/437 |
| 3,708,968 | A | * | 1/1973 | Enters .................. A01D 43/063 56/16.5 |
| 3,863,428 | A | * | 2/1975 | Baxter ................. A01D 46/085 56/10.2 R |
| 3,984,893 | A | * | 10/1976 | Ashley .................. E01H 1/0836 15/339 |
| 4,043,100 | A | * | 8/1977 | Aumann .............. A01D 43/077 56/16.5 |

(Continued)

FOREIGN PATENT DOCUMENTS

FR  2301996 A7 * 9/1976  .......... A01D 43/077

*Primary Examiner* — Thomas B Will
*Assistant Examiner* — Joan D Misa
(74) *Attorney, Agent, or Firm* — Greenblum & Bernstein, P.L.C.

(57) ABSTRACT

A grass mower includes a blade shaft for rotating a blade within a mower deck supported to a vehicle body, a power transmission mechanism for supplying rotational power to the blade shaft, a duct for air-conveying cut grass pieces from the mower deck to the grass collecting bag and a flow boosting device incorporated in the duct. The flow boosting device increases a speed of air flow inside the duct by feeding air through a nozzle opening adjacent an inner circumferential face of the duct along a flow direction of the air flow.

6 Claims, 4 Drawing Sheets

(56) References Cited

U.S. PATENT DOCUMENTS

| | | | | |
|---|---|---|---|---|
| 4,095,398 A * | 6/1978 | Aumann | A01D 43/063 | 15/340.1 |
| 4,104,852 A * | 8/1978 | Tackett | A01D 43/077 | 56/16.6 |
| 4,114,353 A * | 9/1978 | Ansbaugh | A01D 43/077 | 56/13.3 |
| 4,193,249 A * | 3/1980 | Tackett | A01D 43/077 | 56/11.9 |
| 4,271,659 A * | 6/1981 | McConnell | A01D 46/08 | 56/13.3 |
| 4,345,416 A * | 8/1982 | Cameron | A01D 43/077 | 56/13.3 |
| 4,433,532 A * | 2/1984 | McCunn | A01D 43/077 | 15/340.1 |
| 4,488,395 A * | 12/1984 | Mack | A01D 43/077 | 56/13.4 |
| 4,614,080 A * | 9/1986 | Hoepfner | A01D 43/077 | 56/13.3 |
| 4,693,063 A * | 9/1987 | Hoepfner | A01D 43/077 | 56/13.3 |
| 4,773,205 A * | 9/1988 | Hansen | A01D 43/077 | 56/13.3 |
| 4,848,070 A * | 7/1989 | Berglund | A01D 43/063 | 56/202 |
| 4,930,981 A * | 6/1990 | Walker | F04D 29/281 | 415/119 |
| 4,941,231 A * | 7/1990 | Jarosak | A01D 34/001 | 15/328 |
| 4,945,716 A * | 8/1990 | Murakawa | A01D 43/077 | 56/13.3 |
| 4,996,829 A * | 3/1991 | Saitoh | A01D 43/077 | 56/13.3 |
| 5,138,825 A * | 8/1992 | Trefz | A01D 34/64 | 56/11.1 |
| 5,224,327 A * | 7/1993 | Minoura | A01D 43/077 | 56/13.3 |
| 5,245,817 A | 9/1993 | Hohnl | | |
| 5,317,860 A * | 6/1994 | Dunn | A01D 34/71 | 56/12.8 |
| 5,848,521 A * | 12/1998 | Kobayashi | A47L 5/14 | 56/13.2 |
| 5,875,620 A * | 3/1999 | Goeke | A01D 43/077 | 56/13.4 |
| 6,675,566 B2 * | 1/2004 | Martignon | A01D 43/077 | 56/13.3 |
| 6,854,249 B1 | 2/2005 | Samejima et al. | | |
| 2005/0172599 A1 * | 8/2005 | Burcham | A01D 43/063 | 56/202 |
| 2007/0119138 A1 * | 5/2007 | Burcham | A01D 43/077 | 56/202 |

* cited by examiner

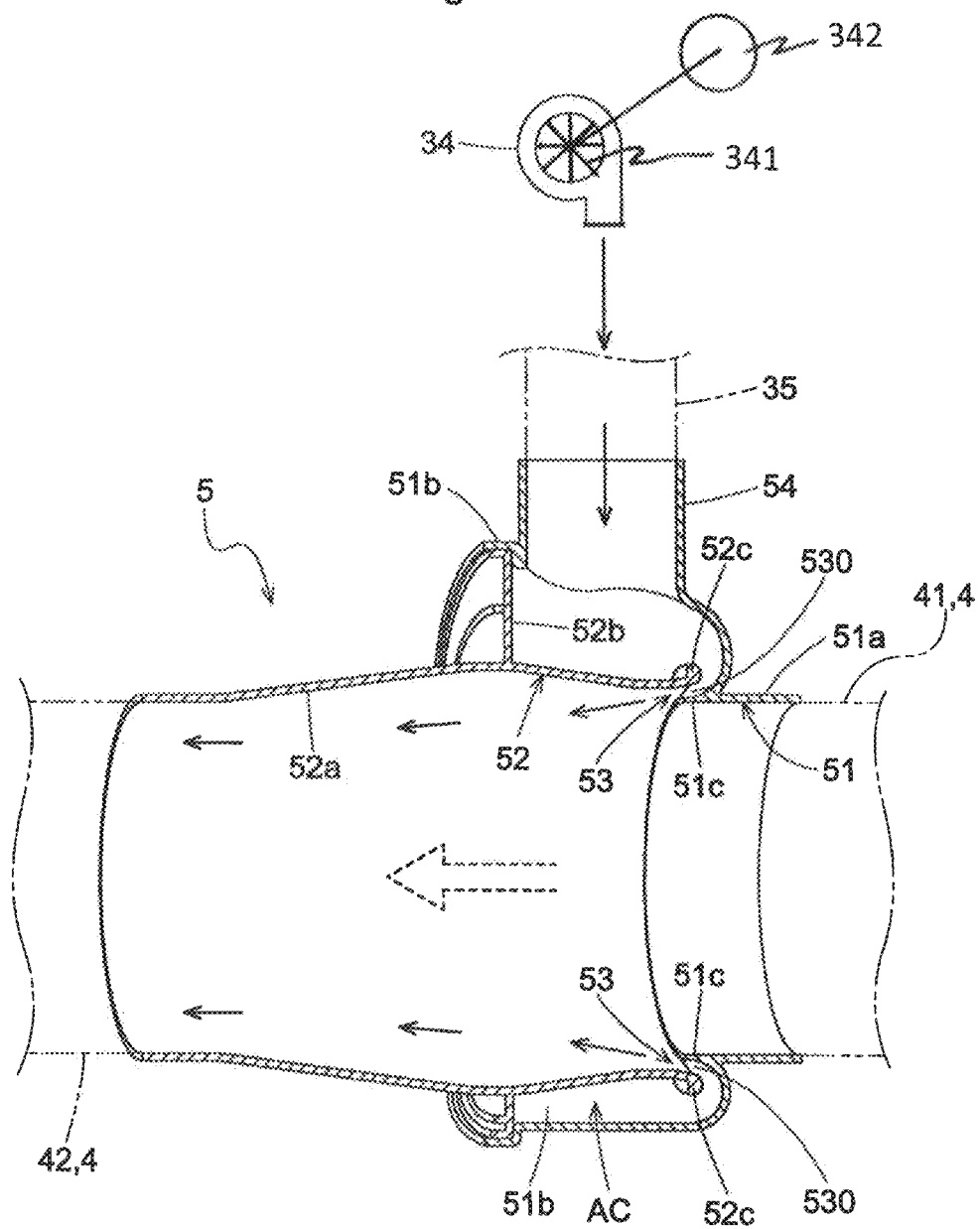

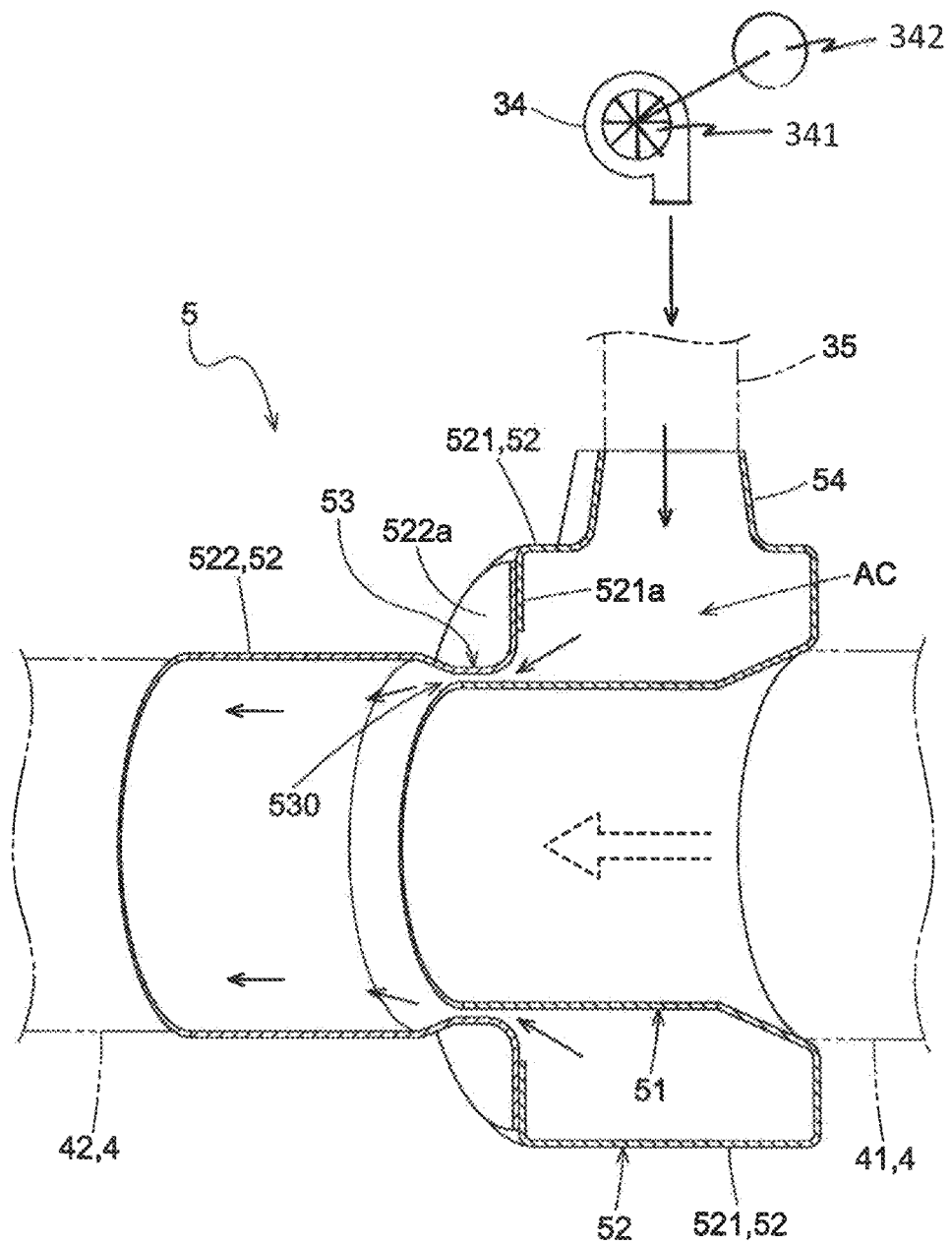

GRASS MOWER AND FLOW BOOSTER

TECHNICAL FIELD

This invention relates to a grass mower having a duct for air-conveying cut grass pieces from a mower deck to a grass collecting container disposed at a rear portion of a vehicle body.

BACKGROUND ART

U.S. Pat. No. 6,854,249 discloses a grass mower including a blade rotatable about a vertical axis within a mower deck, a grass collecting bag mounted at a rear portion of a vehicle body, a duct connecting a cut grass discharging opening of the mower deck to the grass collecting bag, and a blower incorporated at a duct portion around the cut grass discharging opening. The blower has an impeller rotatable about a vertical axis, so that in association with rotation of this impeller, there is generated an air current which passes from the cut grass discharging opening through the duct to reach the grass collecting bag. With this, cut grass pieces will be conveyed from the cut grass discharging opening through the impeller of the blower and then through the duct to be discharged into the grass collecting bag.

U.S. Pat. No. 5,245,817 also discloses a blower for air-conveying cut grass pieces from a mower deck through a duct to a grass collecting bag. This blower includes an impeller rotatable about a horizontal axis. In association with rotation of the impeller, cut grass pieces are conveyed from the cut grass discharging opening upwards and passed through the impeller to be eventually discharged into the grass collecting bag.

In a grass mower, air current used for conveying cut grass pieces from a mower deck to a grass collecting bag contains debris or the like. For this reason, the impeller of the blower will be hit not only by cut grass pieces, but also by such debris, so high durability is required for the impeller. Further, in order to generate an air current for conveying a large amount of cut grass pieces, a large impeller is required. Thus, a high power is required for the blower. A blower satisfying these requirements is expensive.

SUMMARY OF THE INVENTION

An object of the present invention is to provide a grass mower capable of efficiently generating an air current for conveying cut grass pieces from a mower deck to a grass collecting bag.

A grass mower according to the present invention comprise:
 a mower deck supported to a vehicle body;
 a blade shaft for rotating a blade within the mower deck;
 a power transmission mechanism for supplying rotational power to the blade shaft;
 a duct for air-conveying cut grass pieces from the mower deck to the grass collecting bag; and
 a flow boosting device incorporated in the duct, the flow boosting device being configured to increase a speed of air flow inside the duct by feeding air through a nozzle opening adjacent an inner circumferential face of the duct along a flow direction of the air flow.

The above flow boosting device includes a nozzle opening adjacent the inner circumferential face of the duct. In operation, as air is sent through this nozzle opening along the flow of air conveying cut grass pieces, there occurs a pressure drop in the inner circumferential face area of the duct due to the Bernoulli's principle. Then, by this pressure drop, air flow present on the downstream side of the nozzle opening is drawn in, thus increasing the flow speed of the air flow passing the vicinity of the nozzle opening. This increase of flow speed improves cut grass conveying performance from the mower deck to the grass collecting bag. According to the above arrangement, cut grass pieces cut in the mower deck will not reduce the conveying force due to their collision with the fan of the blower device that would occur in the case of the prior art.

According to one preferred embodiment, the flow boosting device includes an inner tubular portion connected to a duct portion on the upstream side in the air flow direction, an outer tubular portion connected to a duct portion on the downstream side in the air flow direction, and an orifice portion acting as the nozzle opening configured to discharge air flow introduced from the outside through an annular gap acting as the nozzle opening and formed between the inner tubular portion and the outer tubular portion. An annular gap as a nozzle opening formed between the inner tubular portion and the outer tubular portion constitutes an orifice portion. In operation, air entering the flow boosting device is discharged vigorously from this gap acting as a nozzle opening and will flow keeping close contact with the inner wall face of the outer tubular portion (or the inner wall face of the duct), so that its pressure will be dropped. This pressure drop causes a pressure difference between air flowing in the inner tubular portion and air flowing in the outer tubular portion, which pressure difference draws in the air flowing on the inner wall face of the outer tubular portion, whereby the speed of air flow flowing in the duct is increased.

In order to increase the speed of air flow discharged from the nozzle opening, it will be advantageous if the air flowing into the flow boosting device has a high pressure. Thus, it is preferred that air flow produced by a blower device be caused to flow into the flow boosting device. In the course of this, since the mower deck is provided with the power transmission mechanism for rotating the blade shaft, it is preferred that the above blower device be provided adjacent the mower deck in order to receive power from this power transmission device. For this reason, according to one preferred embodiment of the present invention, a blower device is provided at a connecting area between the duct and the mower deck and air flow generated by the blower device is sent to the orifice portion.

BRIEF DESCRIPTION OF THE DRAWINGS

FIG. 3 is a perspective view in vertical section showing a first embodiment of a flow boosting device,
and
FIG. 4 is a perspective view in vertical section showing a second embodiment of a flow boosting device.

DETAILED DESCRIPTION

Figure 1:
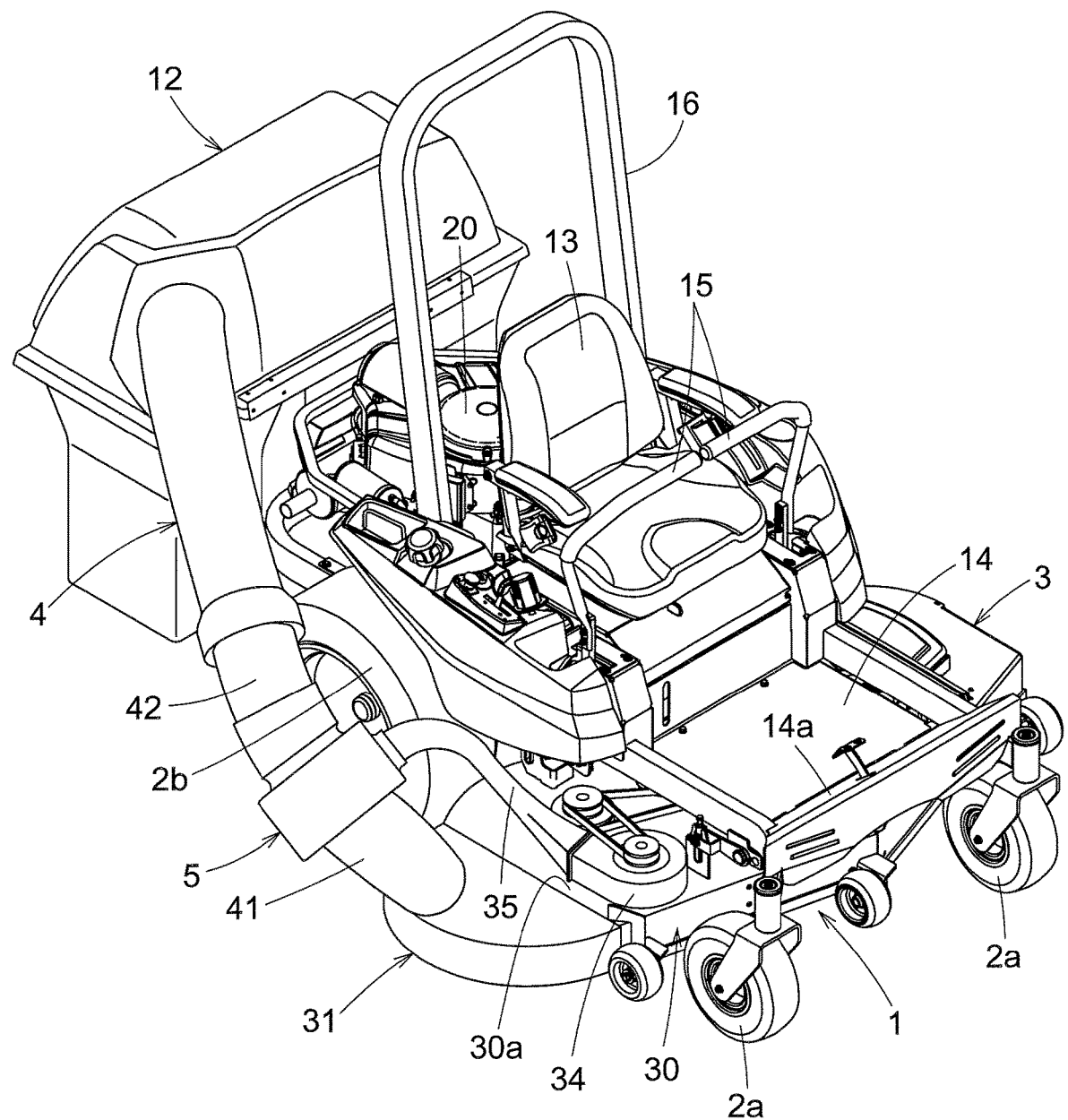
FIG. 1 is a perspective view of a grass mower.

Next, with reference to the drawings, one specific embodiment of the grass mower according to the present invention will be described. In this detailed description, unless indicated otherwise, a word "front" means a front side with respect to a vehicle body front-rear direction (running direction), and a word "rear" means a rear side with respect to the vehicle body front-rear direction (running direction). Further, a left-right direction or a lateral direction means a vehicle body transverse direction (vehicle body width direction) perpendicular to the vehicle body front-rear direction. Also, a word "upper" or "lower" signifies a positional relationship in the perpendicular direction of the vehicle body (perpendicular direction), thus indicating a relationship respecting the ground height.

This grass mower includes a pair of left and right front wheels 2a, a pair of left and right rear wheels 2b and a vehicle body 1 supported by these front wheels 2a and the rear wheels 2b. The front wheels 2a are caster wheels. The rear wheels 2b are driving wheels, so that each one of the left and right rear wheels 2b can be controlled in its forward/reverse speed independently.

The vehicle body 1 is a frame structure comprised of angular pipes, etc. At a rear portion of the vehicle body 1, an engine 20 is mounted. And, rearwardly of the engine 20, a grass collecting container 12 for collecting cut grass pieces is provided. Forwardly of the engine 20, a driver's seat 13 is disposed, and forwardly of this driver's seat 13, a floor 14 and a foot rest 14a are disposed. On opposed sides of the driver's seat 13, there are disposed a pair of left and right control levers 15. Rearwardly of the driver's seat 13, a ROPS 16 is disposed vertically.

Figure 2:
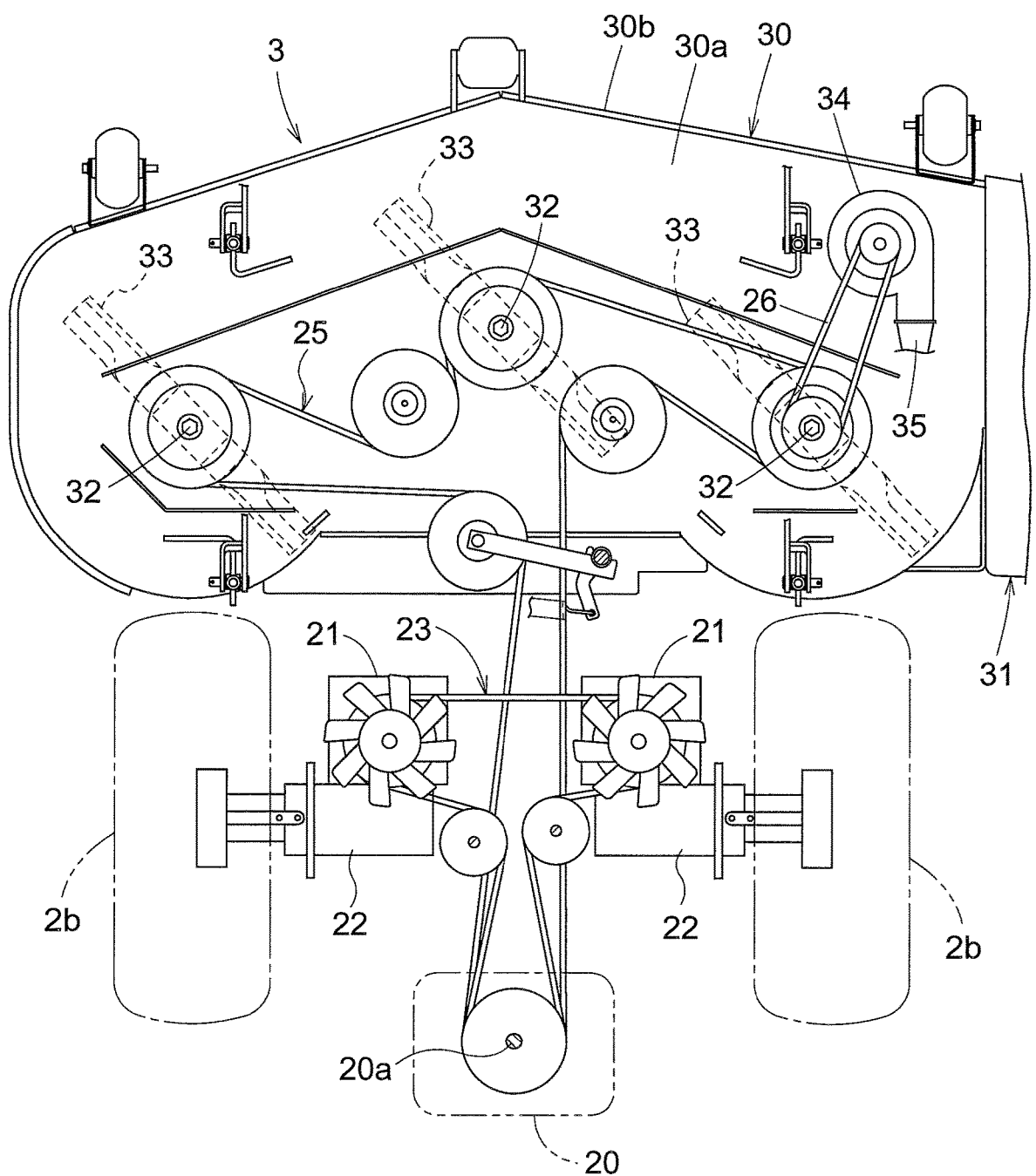
FIG. 2 is a plan view showing a power transmission line of the grass mower.

Between the front wheels 2a and the rear wheels 2b, a mower unit 3 is suspended from the vehicle body 1 to be lifted up/down. As shown in FIG. 2, the mower unit 3 includes a mower deck 30 consisting of a top plate 30a and a side plate 30b extending downwards from the outer edge of the top plate 30a, blade shafts 32 for rotating blades 33 within the mower deck 30, and a power transmission mechanism 25 for providing the blade shafts 32 with rotational power. At a right end portion of the mower deck 30, a cut grass discharging boot 31 is provided.

To the cut grass discharging boot 31 of the mower deck 30, there is connected a duct 4 for air-conveying cut grass pieces cut by the blades 33 to the grass collecting container 12. For enabling this air-conveying of cut grass pieces, the duct 4 incorporates a flow boosting device 5 for providing boosted air flow to the duct 4. Further, a blower device 34 is attached to a top plate 30a adjacent the cut grass discharging boot 31 of the mower deck 30. Air flow generated by the blower device 34 is fed to the flow boosting device 5.

Next, with reference to FIG. 2, a power transmission line of this grass mower will be explained. In correspondence with each one of the left and right rear wheels 2b, there are provided an HST (hydrostatic transmission) 21 and a gear transmission mechanism 22 for transmitting power to the corresponding rear wheel 2b. An output shaft 20a of the engine 20 and the respective HST's 21 include pulleys constituting a running belt transmission mechanism 23, so that power of the engine 20 is transmitted to the HST's 21.

A speed change ratio of the respective HST 21 (a range from a forward maximal speed through a neutral to a reverse maximal speed) is adjusted based on an operational displacement using the pair of left and right control levers 15. In accordance with respective positions of the control levers 15, there are selectively realized a neutral state in which no rotational powers are transmitted to the left and right rear wheels 2b, a forward run state in which the left and right rear wheels 2b are driven at an equal speed forwardly or reversely, a gentle turn state in which the left and right rear wheels 2b are driven forwardly or reversely at different speeds from each other, a pivot turn state in which one of the left and right rear wheels 2b is stopped and the other is driven forwardly or reversely, and a spin turn state in which one of the left and right rear wheels 2b is driven forwardly and the other is driven reversely.

As shown in FIG. 2, among the blade shafts 32 mounting the three blades 33 disposed side by side in the vehicle body transverse direction and the output shaft 20a of the engine 20, there is provided a belt transmission mechanism as a "mower unit power transmission mechanism" 25, so that power from the engine 20 is transmitted to the mower unit 3.

Further, there is provided a blower power transmission device 26 for transmitting power taken off the left side blade shaft 32 to the blower device 34. The blower device 34 sends air flow generated by rotating a fan (not shown) by power obtained via the blower belt transmission mechanism 26 to the flow boosting device 5.

Next, with reference to FIG. 3 and FIG. 4, the flow boosting device 5 will be explained. In FIG. 3 and FIG. 4, a first duct portion 41 which is a duct portion between the flow boosting device 5 and the mower unit 3 and a second duct portion 42 which is a duct portion between the flow boosting device 5 and the grass collecting container 12 are denoted with two-dot chain lines respectively. This flow boosting device 5 is configured to feed a high-speed air flow through a nozzle opening disposed adjacent the inner circumferential face of the duct 4 along the flow direction of cut grass conveying flow of the duct 4, thus drawing in the cut grass conveying flow present on the upstream side of the nozzle opening, thus increasing (boosting) its speed consequently. As shown in FIG. 1, the flow boosting device 5 is disposed at a portion of the duct 4 near the mower unit 3.

FIG. 3 shows a flow boosting device 5 according to a first embodiment. The flow boosting device 5 consists essentially of an inner tubular portion 51 connected to the first duct portion 41, an outer tubular portion 52 connected to the second duct portion 42 and an orifice portion 53.

The outer tubular portion 52 consists of an approximately cylindrical tubular portion 52a, a flange 52b extending radially outwards from the tubular portion 52a, and an orifice forming portion 52c which forms the leading end of the tubular portion 52a. The inner tubular portion 51 consists of an approximately cylindrical first tubular portion 51a, an approximately cylindrical second tubular portion 51b, an orifice forming portion 51c which is a transition portion from the first tubular portion 51a to the second tubular portion 51b, and a connecting tube 54. A terminal end on the downstream side in the flow direction of the second tubular portion 51b has a greater diameter than an outer circumferential edge of the flange 52b and gaplessly joined to this outer circumferential edge of the flange 52b. Further, the second tubular portion 51b has an overlapped portion having a greater diameter than the first tubular portion 51a, along which the second tubular portion 51b and the first tubular portion 51a are overlapped with each other with forming a radial spacing therebetween as they extend in the axial direction. The space delimited by this overlapped portion constitutes an accumulator space AC. At a portion of the second tubular portion 51b forming the accumulator space, the connecting tube 54 is formed.

The orifice portion 53 consists of the orifice forming portion 52c of the inner tubular portion 51 and the orifice forming portion 51c of the tubular portion 52a, with the orifice portion forming 51c extending into the inner circumferential face side of the orifice forming portion 52c. An annular gap formed between the orifice forming portion 51c and the orifice forming portion 52c constitutes a nozzle 530 acting as an orifice, so the gap between the orifice forming portion 51c and the orifice forming portion 52c is determined to act as an orifice. Incidentally and alternatively, the orifice portion 53 can be formed as a nozzle body which is inserted between the second outer tubular portion 522 and the inner tubular portion 51, and such nozzle body can define a number of nozzle holes that are distributed in its circumferential direction and that extend along its axial direction.

To the connecting tube 54, one end of an air guide tube 35 joining the blower device 34 with the flow boosting device 5 is connected. When the blower device 34 is driven, air flow generated thereby is sent via the air guide tube 35 into the accumulator space AC of the flow boosting device 5. This air flow sent into the accumulator space AC will then be discharged as a high-pressure air flow through the nozzle opening 530.

Air flow generated inside the mower deck 30 in association with driving of the blades 33 will flow, together with cut grass pieces, from the cut grass discharging boot 31 through the first duct portion 41 to reach the inner tubular portion 51. The size of the nozzle opening 530 and the air feeding amount of the blower device 34 are determined such that the velocity of air flow discharged through the nozzle opening 530 may be far higher than that of the blade air flow flowing in the inner tubular portion 51. With this arrangement, in the vicinity of the nozzle opening 530, the blade air flow will be drawn into the air flow discharged from the nozzle opening 530, whereby the velocity of the blade air flow is increased, and consequently the flow amount of the air flow flowing in the duct 4 is increased, thus boosting cut grass conveying force.

FIG. 4 shows a flow boosting device 5 according to a second embodiment. In this second embodiment too, as shown in FIG. 1, the flow boosting device 5 is disposed at a portion of the duct 4 near the mower unit 3. The flow boosting device 5 consists essentially of an inner tubular portion 51 connected to the first duct portion 41, an outer tubular portion 52 connected to the second duct portion 42 and an orifice portion 53.

In this embodiment, for the sake of readiness of its manufacture, the outer tubular portion 52 is initially provided separately as a first outer tubular portion 521 on the first duct 41 side and a second outer tubular portion 522 on the second duct 42 side, which are joined to each other subsequently. The first outer tubular portion 521 and the inner tubular portion 51 are connected on the first duct 41 side. Namely, the first outer tubular portion 521 and the inner tubular portion 51 are formed integrally. This integrated assembly has a shape similar to a shape which is formed by turning over one end of a cylinder to the outer side. And, the turned-over portion constitutes the first outer tubular portion 521. The first outer tubular portion 521 and the second outer tubular portion 522 include flanges 521a, 522a extending radially to face each other; and the first outer tubular portion 521 and the second outer tubular portion 522 are joined to each other via these flanges 521a, 522a. In the second outer tubular portion 522, its portion in transition to the flange 522a is constricted to approach the outer circumferential face of the inner tubular portion 51. And, the second outer tubular portion 522 and the inner tubular portion 51 at this constricted area together form the orifice portion 53. The cut grass collecting container 12 side end portion of the orifice portion 53 is an annular gap, which acts as a nozzle opening 530. Incidentally and alternatively, in this embodiment too, the orifice portion 53 can be formed as a nozzle body which is inserted between the second outer tubular portion 522 and the inner tubular portion 51, and such nozzle body can define a number of nozzle holes that are distributed in its circumferential direction and that extend along its axial direction.

Except for the area of the orifice portion 53, the second outer tubular portion 522 and the inner tubular portion 51 are widely spaced apart from each other, between which an accumulator space AC is formed. In the second outer tubular portion 522, there is provided a connecting tube 54 to which one end of an air guide tube 35 joining the blower device 34 with the flow boosting device 5 is connected. When the blower device 34 is driven, air flow generated thereby is sent via the air guide tube 35 into the accumulator space AC of the flow boosting device 5. This air flow sent into the accumulator space AC will then be discharged as a high-pressure air flow through the nozzle opening 530.

Next, other embodiments of the present invention will be described respectively.

(1) In the foregoing embodiment, the outer tubular portion 52 is initially provided separately as the first outer tubular portion 521 and the second outer tubular portion 522. Instead, the first outer tubular portion 521 and the second outer tubular portion 522 can be provided integral. Further, in the foregoing embodiment, the inner tubular portion 51 and the first outer tubular portion 521 are formed integral. Instead, these may be manufactured as separate components, which may be joined to each other later.

(2) Such languages as the inner tubular portion 51, the outer tubular portion 52 and the orifice portion 53 describe their functions. Thus, the specific arrangements thereof can be modified in various ways. For instance, as the inner tubular portion 51 or the outer tubular portion 52, a portion of the duct 4 can be used. In such case, the orifice portion 53 and the nozzle opening 530 too can be formed of through holes defined in the circumferential wall of the duct 4.

(3) In the foregoing embodiment, the blower device 34 is driven by power taken off from the mower unit power transmission mechanism 25 for driving the blade shafts 32. Instead of this, the blower device 34 can be configured to receive power directly from the engine 20. Further, in case the grass mower is an electrically powered mower mounting a battery and an electric motor, the blower device 34 can be an electric motor-driven type device.

(4) In the foregoing embodiment, air flow sent into the accumulator space AC from the outside is generated by the blower device 34. Instead of this, this air flow can be taken off from the air flow generated by a radiator fan of the engine 20 or air flow generated in association with vehicle run can be collected and sent into the accumulator space AC.

(5) In the foregoing embodiment, the invention is applied to a mid-mount type grass mower. Instead, the invention may be applied to a front-mower type grass mower.

Incidentally, the arrangement disclosed in the above embodiment (including the further embodiments) can be used in combination with the arrangements of the further embodiments as long as no contraction occurs resulting from such combination. Further, it is also understood that the embodiments disclosed in the above detailed description are only exemplary, so embodiments of the present invention are not limited thereto, but various modifications can be made thereto appropriately as long as no departure from the object of the invention occurs.

The invention claimed is:
1. A grass mower comprising:
a mower deck supported to a vehicle body;
a blade shaft rotating a blade within the mower deck;
a power transmission mechanism supplying rotational power to the blade shaft;
a duct configured to air-convey cut grass pieces from the mower deck to a grass collecting bag;

said duct having a first end coupled to the mower deck and a second end;

a flow boosting device incorporated in the duct and located between the first and second ends of the duct; and said flow boosting device comprising:

a first tubular portion configured to allow the air-conveyed grass pieces to pass therethough and having an end with a first diameter that is spaced from the mower deck;

a second tubular portion configured to allow the air-conveyed grass pieces to pass therethough and having a portion that at least partially surrounds the first tubular portion and has a second diameter that is larger than the first diameter;

an air chamber surrounding a portion of the second tubular portion and being configured to receive air from outside the air chamber;

a connecting tube coupled to the air chamber and allowing the outside air to pass therethrough and into the air chamber; and an annular nozzle opening axially located between portions of the first and second tubular portions and configured to discharge air flow into the second tubular portion from the air chamber and at a higher velocity than air flow passing through the first tubular portion, wherein the flow boosting device is configured to increase a speed of air flow inside the duct so as to more efficiently convey the grass pieces to the grass collecting bag.

2. The grass mower of claim 1, further comprising a blower device configured to deliver an air-flow to the connecting tube.

3. The grass mower of claim 2, wherein the blower device is configured to utilize rotational power supplied from the power transmission mechanism.

4. The grass mower of claim 2, wherein the power transmission mechanism comprises a belt transmission mechanism configured to rotate a pulley mounted on the blade shaft and a pulley mounted on an impeller of the blower.

5. A grass mower comprising:

a mower deck supported to a vehicle body;

a blade shaft rotating a blade within the mower deck;

a duct configured to air-convey cut grass pieces from the mower deck to a grass collecting bag;

said duct having a first end coupled to the mower deck and a second end;

a blower mechanism;

a flow boosting device incorporated in the duct and located between the first and second ends of the duct; and said flow boosting device comprising:

a first tubular portion configured to allow the air-conveyed grass pieces to pass therethough and having an end with a first diameter that is spaced from the mower deck;

a second tubular portion configured to allow the air-conveyed grass pieces to pass therethough and having a portion that at least partially surrounds the first tubular portion and has a second diameter that is larger than the first diameter;

an annular air chamber surrounding a portion of the second tubular portion and being configured to receive air from the blower mechanism;

a connecting tube coupled to the air chamber and allowing the air from the blower mechanism to pass therethrough and into the air chamber; and an annular nozzle opening axially located between portions of the first and second tubular portions and configured to discharge air flow into the second tubular portion from the air chamber and at a higher velocity than air flow passing through the first tubular portion, wherein the flow boosting device is configured to increase a speed of air flow inside the duct so as to more efficiently convey the grass pieces to the grass collecting bag.

6. A grass mower comprising:

a mower deck supported to a vehicle body;

a blade shaft rotating a blade within the mower deck;

a duct configured to air-convey cut grass pieces from the mower deck to a grass collecting bag;

said duct having a first end coupled to the mower deck and a second end;

a blower mechanism;

a flow boosting device incorporated in the duct and located between the first and second ends of the duct; and said flow boosting device comprising:

a first tubular portion configured to allow the air-conveyed grass pieces to pass therethough and having an end with a first diameter that is spaced from the mower deck;

a second tubular portion configured to allow the air-conveyed grass pieces to pass therethough and having a portion that at least partially surrounds the first tubular portion and has a second diameter that is larger than the first diameter;

an annular air chamber surrounding a portion of the second tubular portion and being configured to receive air from the blower mechanism;

a connecting tube coupled to the air chamber and allowing the air from the blower mechanism to pass therethrough and into the air chamber; and one or more nozzle openings axially located between portions of the first and second tubular portions and configured to discharge air flow into the second tubular portion from the air chamber and at a higher velocity than air flow passing through the first tubular portion, wherein the flow boosting device is configured to increase a speed of air flow inside the duct so as to more efficiently convey the grass pieces to the grass collecting bag.

* * * * *

UNITED STATES PATENT AND TRADEMARK OFFICE
CERTIFICATE OF CORRECTION

PATENT NO. : 10,905,047 B2  
APPLICATION NO. : 15/963418  
DATED : February 2, 2021  
INVENTOR(S) : Walden Page 1 of 1

It is certified that error appears in the above-identified patent and that said Letters Patent is hereby corrected as shown below:

In the Claims

At Column 7, Line 8 (Claim 1, Line 15), please change "threrethough" to -- therethrough --.
At Column 7, Line 12 (Claim 1, Line 19), please change "threrethough" to -- therethrough --.
At Column 7, Line 57 (Claim 5, Line 14), please change "threrethough" to -- therethrough --.
At Column 8, Line 2 (Claim 5, Line 18), please change "threrethough" to -- therethrough --.
At Column 8, Line 35 (Claim 6, Line 14), please change "threrethough" to -- therethrough --.
At Column 8, Line 39 (Claim 6, Line 18), please change "threrethough" to -- therethrough --.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*